Figure 1:
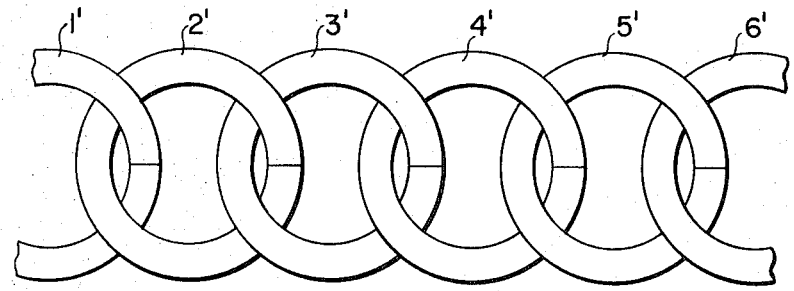

United States Patent [19]
Wahlbeck

[11] 3,720,391
[45] March 13, 1973

[54] BAND OF PARALLEL, OPPOSITELY CURBED CHAINS SOLDERED TOGETHER AT THE LINK SOLDER JOINTS

[75] Inventor: Hans Gustav Erik Wahlbeck, Stallarholmen, Sweden

[73] Assignee: Firma Erik H. Wahlbeck, Stallarholmen, Sweden

[22] Filed: June 15, 1971

[21] Appl. No.: 153,351

[30] Foreign Application Priority Data

June 15, 1970 Sweden ...............................8275/70

[52] U.S. Cl. ................................245/4, 59/80, 63/2, 245/9, 245/10
[51] Int. Cl. ..............................................B21f 31/00
[58] Field of Search .....63/2, 4; 59/80, 81, 83; 245/4, 245/5, 10, 9

[56] References Cited
UNITED STATES PATENTS 1,380,827   6/1921   Mullins......................................63/2

Primary Examiner—F. Barry Shay
Attorney—Larson, Taylor & Hinds

[57] ABSTRACT

Bracelets, necklaces, etc., are composed of rows of flattened link chains adjacent to each other in parallel formation, adjacent links of adjacent chains being soldered together at their abutting edges, the links of each chain being screwed, or curbed in opposite directions relative to the links of each adjacent chain such that the adjacent circumferential portions in the abutting edge areas of soldered links in adjacent chains are of corresponding screw bends relative to the plane of the band, the links contained in the chains being formed of bent pieces of wire the ends of which are soldered together to form closed links, the soldered end joints in each of said links being located adjacent the link of an adjacent chain such that the soldered end joint of each link is within a soldered connection between adjacent links of adjacent chains.

3 Claims, 3 Drawing Figures

PATENTED MAR 13 1973

3,720,391

INVENTOR
HANS G. E. WAHLBECK

*Larson, Taylor and Hinds*
ATTORNEYS

BAND OF PARALLEL, OPPOSITELY CURBED CHAINS SOLDERED TOGETHER AT THE LINK SOLDER JOINTS

Bracelets, necklaces and similar gems often are composed from simple link chains, combined with each other or meshing with their links into each other. Amongst link chains, a very usual form probably is the so called flattened chain, which is composed by closed chain links, said links, however, being screwed in such a way that the links form an at least approximately flattened band, whereas, in the non-screwed chain each link is placed in a level, which is at least approximately perpendicular to the level of the adjacent links. Many trials have been made to combine with each other into a comprehensive band a plurality of flattened chains, but these trials have hitherto not given any acceptable result.

The present invention refers to such a tape formed gem, which is composed of flattened chains, combined with each other and running in parallel to each other.

The invention is based upon an intricate investigation of the reason why the earlier trials have had no success. Thereby the following has been found:

Generally, in the production of link chains, and especially in the production of flattened link chains, one always started from a drawn wire of the metal, from which the chain is produced, usually of gold. The production then is continued by pieces of said wire being cut off in machine, put in correct relation to the link next before, bent in ring-form under such deformation that it is screwed, or curbed, and thereafter soldered together to a closed link. The soldering place of such a link means a scar, which is often visible, and it was therefore desirable, as far as possible to hide said soldering place. For this reason one always put the soldering place in a bend of the link, which is in the interior of the adjacent link. Another reason for this step has been that one knows by experience that the soldering place means the point in a link of the type concerned, which is weak against wearing. One also knows, that the wearing of gold against gold usually is rather small, but, on the other hand that the wearing of gold against outer subjects of varying kind may assume much greater magnitude. By arranging the soldering place in the way just mentioned one will also free the soldering place from contact with outer wearing subjects.

In tests to combine two or more individual flattened chains running in parallel to each other by soldering into one single chain band, one always found it necessary to solder together one link on each chain with the corresponding link on each of the two chains, situated on each side of the first mentioned chain. In order that this soldering should remain and get the required rigidity, as a matter of fact, rather much heat must be added to the solder. This heat is distributing through the link ring, whereby it should especially be kept in mind that gold, also alloyed gold is a very good heat conductor. The amount of heat thus distributed through the ring will thereby get up to the place, where the link is provided with its own interior soldering joint, and this is weakened, so that the link tends, by its own resilient force to expand, thereby opening a gap in the soldering place.

These difficulties are overcome according to the present invention by producing the simple flattened chains, from which the band is made, alternately screwing some of them in one direction and screwing the others in the other direction, and thereby arranging the interior soldering joint in each link within the screwed area of the circumference, more closely so that the soldered joint will coincide with the place, in which links in the two chains situated at the side of each other and corresponding to each other are soldered together.

The invention will be further described below in connection with the attached drawing, which shows one form of execution of the invention, but, of course, it is understood that the invention is not limited to this specific form of execution, but that all different kinds of modifications may occur within the scope of the invention.

Figure 2:
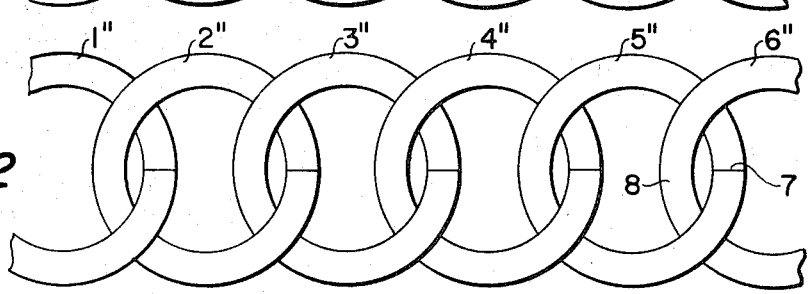
Figure 3:
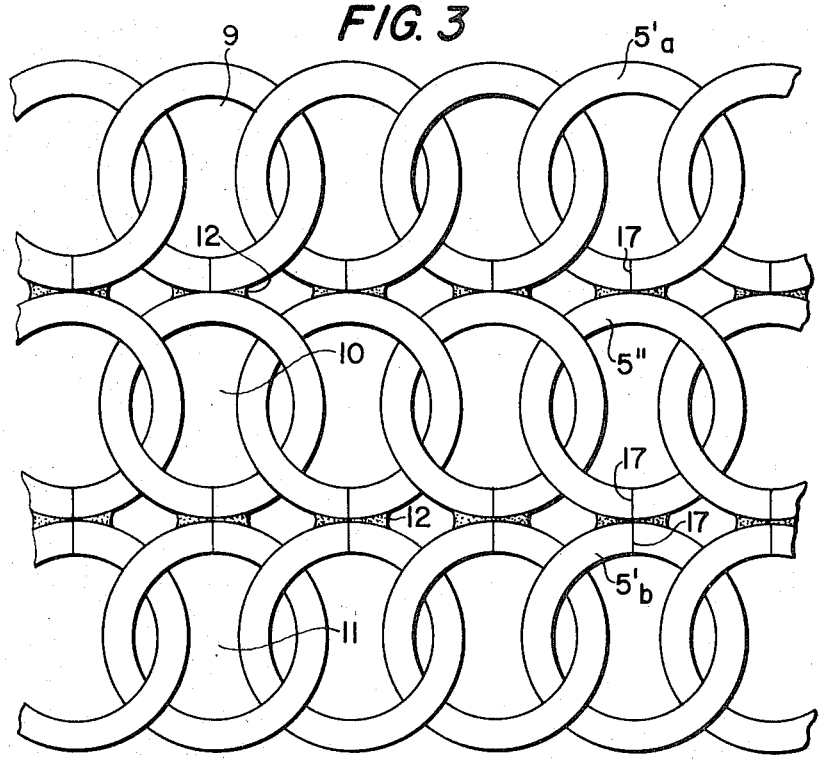

Thus, FIG. 1 shows from the even upper side a schematic picture of a single chain link row of a so called flattened chain, screwed in left screwing, whereas FIG. 2 shows a similar link row, screwed in right screwing, both made in the traditional way. FIG. 3 shows a composed chain according to the present invention, containing one left screwed, one right screwed and thereafter again one left screwed chain link row.

In all of the three figures the wire, from which the chain links are made has been shown with a dimension, which is somewhat too small in relation to the circumference of the link, which has, however, only been made in order to make the drawings more clear.

In FIG. 1 and FIG. 2, respectively, thus, the links 1', 2', 3', 4', 5' and 6' are combined with each other to a plane and flattened chain with left screwing. In FIG. 2 the corresponding links 1'', 2'', 3'', 4'', 5'' and 6'' are combined with each other to a simple flattened chain with right screwing. In all cases, the interior joints or soldering places 7 are arranged in levels, running in the proper longitudinal direction of the chain, so that these soldering places, when the chain is stretched, will be well protected by a bend of the adjacent link. Regarding now thus the joint or soldering place 7 of the link 5', FIG. 1, or 5'', FIG. 2, one will see that this is placed tightly to the bend 8 of the link 6', FIG. 1, or 6'', FIG. 2, resp,. This, thus, has been the traditional method for arranging the soldering places within each separate link in a flattened chain.

The trials, made up to this time for joining a plurality of flattened chains side by side, however, have not followed the drawing picture, which is found in FIG. 3, but differed from this in two respects. Firstly one has not understood that one should alternatively use left screwed and right screwed chains. In FIG. 3, which shows a chain according to the present invention, thus the chain 9 is right screwed, the chain 10 is left screwed, the chain 11 is right screwed and so on. In this way one has gained that the two links adjacent to each other, which are combined mutually by the soldering joint 12, will run in the soldering place completely in parallel, whereby a rather great amount of the circumference of the links could be soldered to each other without the chain looking unattractive. Secondly both the left screwed and the right screwed chains have been made in a way deviating from what was traditional, viz. with the interior soldering joint in each link placed in a level, which runs at least approximately perpendicularly to the longitudinal direction of the chain, whereby it will immediately be combined with the solder in the soldering joint 12. If now heat should be conducted through the link to parts of same distant from the soldering place, then there is no place within said link, where said heat could cause a release of any earlier solder joint, and the above mentioned disadvantage, consequently, is completely done away with. By the pressure or the fixation of two links combined with each other by solder, for instance the links $5'_a$, $5''$ and $5'_b$ and so on, said links are prevented from being pressed apart even if the interior solder in the soldering joint 17 should accidentally melt or get weak.

It is also seen that in the composed band according to FIG. 3 this band does only contain three unit chains 9, 10 and 11, but it is obvious that the band may contain any deliberate number of unit chains, however each second one of them should always be screwed in left direction and the other one be screwed in right direction. One should further avoid that the soldering places in any single one of these unity chains be situated at the edge of the composed chain. For that reason the chain 11 is turned in relation to chain 9 in such a way that in chain 9 the soldering places will be situated on the bend, turned downwardly in the drawing of each link, which is in contact with a corresponding bend of the chain 10, whereas within the chain 11 the soldering places are in the bend turned upwardly in the drawing in contact with the corresponding bend of the chain 10, also containing a soldering place.

I claim:

1. An article of jewelry in band form composed of individual flattened link chains arranged adjacent to each other in parallel formation with the links of said chains being mutually aligned transversely of the chains, said transversely aligned links of adjacent chains being soldered together at their abutting edges, the links of each chain being screwed in opposite directions relative to the links of each adjacent chain such that the adjacent circumferential portions in the abutting soldered edge areas of said transversely aligned links in adjacent chains are screwed toward the same side of the plane of the band, the links contained in the individual chains being formed of bent pieces of wire the ends of which are soldered together to form closed links, the soldered end joint in each of said links being located adjacent a link of an adjacent chain such that the soldered end joint of each link is within the soldered connection between transversely aligned links of adjacent chains.

2. An article of jewelry in band form as claimed in claim 1 wherein the band is formed of at least three individual flattened link chains, the two outer chains having their links screwed in corresponding directions opposite from the screw direction of the links of the inner chain, the soldered end joints of the links of each outer chain being located adjacent opposite outer edges of the links of the inner chain.

3. An article of jewelry in band form as claimed in claim 1 wherein the screw bends of each link are concentrated substantially in the circumferential portions thereof which are in contact with transversely aligned links of adjacent chains.

* * * * *